United States Patent [19]

Schmitz et al.

[11] Patent Number: 5,752,491

[45] Date of Patent: May 19, 1998

[54] METHOD FOR CONTROLLING A PISTON-TYPE INTERNAL COMBUSTION ENGINE

[75] Inventors: Guenter Schmitz; Ekkehard Schrey; Martin Pischinger, all of Aachen, Germany

[73] Assignee: FEV Motorentechnik GmbH & Co KG, Aachen, Germany

[21] Appl. No.: 699,231

[22] Filed: Aug. 19, 1996

[30] Foreign Application Priority Data

Aug. 17, 1995 [DE] Germany .................. 195 30 274.5

[51] Int. Cl.$^6$ .................................................. F02D 41/00
[52] U.S. Cl. .................................................. 123/672
[58] Field of Search .................. 123/672, 90.11

[56] References Cited

U.S. PATENT DOCUMENTS

| | | | |
|---|---|---|---|
| 4,945,870 | 8/1990 | Richeson | 123/90.11 |
| 5,022,357 | 6/1991 | Kawamura | 123/90.11 |
| 5,115,782 | 5/1992 | Klinke et al. | 123/672 |

FOREIGN PATENT DOCUMENTS 3024109  9/1989  Germany .................. 123/672

*Primary Examiner*—Raymond A. Nelli
*Attorney, Agent, or Firm*—Spencer & Frank

[57] ABSTRACT

A method for controlling a piston-type internal combustion engine including dosing a fuel amount conditional upon a desired engine output and dosing a required air amount by controlling opening times of at least the gas intake valves.

5 Claims, 4 Drawing Sheets

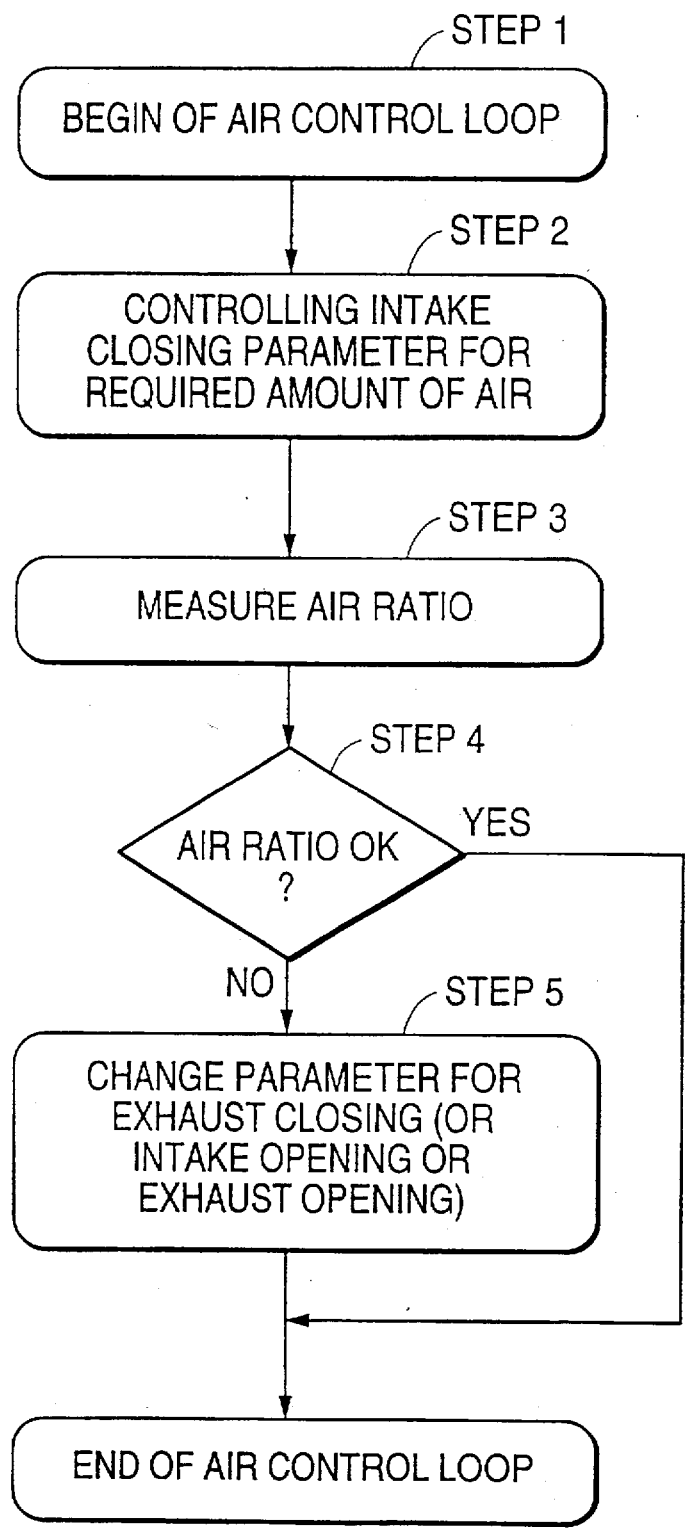

METHOD FOR CONTROLLING A PISTON-TYPE INTERNAL COMBUSTION ENGINE

CROSS REFERENCE TO RELATED APPLICATIONS

This application claims the right of priority of application DE 195 30 274.5 filed in Germany on Aug. 17, 1995, the disclosure of which is incorporated herein by reference.

BACKGROUND OF THE INVENTION

A control of the so-called Lambda air ratio to reduce contaminants is extremely important for a piston-type internal combustion engine with a catalytic converter. In contemporary engines, the control to obtain a specific Lambda air ratio is made via a change in the injected fuel amount because the control of the fuel dosing is faster and easier, as compared to a control of the air dosing. This method has also been used for piston-type internal combustion engines with a fully variable valve drive, that is for systems wherein the gas intake valves and the gas exhaust valves can be controlled variably and independent of each other.

SUMMARY OF THE INVENTION

It is an object of the invention to provide a method which makes it possible to improve the air ratio.

The above and other objects are achieved in accordance with the invention by the provision of a method for controlling a piston-type internal combustion engine having cylinders and cylinder valves including gas intake valves for controlling fuel and air amounts fed to the cylinder, comprising: dosing a fuel amount depending on a desired engine output; and dosing a required air amount by controlling opening times of at least the gas intake valves.

Surprisingly, it has been determined that further advantages can be achieved if the load requirement has an effect on the fuel dosing, that is, if the load requirement has an effect on the injected amount and if the amount of air follows respectively. The energy supplied to the piston-type combustion engine is determined essentially by the fuel amount so that in case of variations in the fuel amount, the engine output will change by the same measure. If the fuel volume flow is held constant, the engine output will change only to a slight degree during variations in the supplied air amount as only the operating ratio changes. Now, if the fuel amount is controlled such that it corresponds to the performance requirements of the piston-type internal combustion engine and if the adjustment (control or regulation) of the air ratio is made via the air amount, the advantage results that the fuel amount represents the main control parameter for the engine load, even with changing bypass pressure or supercharged piston-type internal combustion engines. The control or regulation to a desired air ratio is then achieved preferably by way of a control of the opening times of at least the gas intake valves. In this case, the control takes place effectively via the "intake closing" parameter, because this parameter has the greatest influence on the amount of fresh air taken in.

In one variation, it is possible to also incorporate into the method the other parameters for valve control which influence the amount of fresh air in the cylinder, in order to maintain a predetermined air ratio. Besides the "intake closing" parameter, it may be useful to additionally incorporate the "intake opening" and/or the "exhaust opening" and/or the "exhaust closing" parameters into the fresh air supply control/regulation, depending on the required engine load. With changes in these control parameters, in particular the control parameters concerning the gas exhaust valves, the air amounts can be varied through changing of the residual gas content in the respective cylinder and thus also the share of fresh air.

In one particularly advantageous embodiment of the invention, a coarse adjustment of the air ratio is effected through control of the "intake closing" parameter and a precise adjustment is effected by changing the "intake opening" and/or "exhaust opening" and/or "exhaust closing" parameters. A combined control and regulation of the air ratio through the amount of air as well as through the amount of fuel offers itself at certain operational points. Thus, the regulation of the air ratio via the cylinder valve drive, for example, is possible only to an adjustment range limit, that is until the cylinder has filled with the maximum amount of fresh air. If it is determined that the operating state during this operation is too rich, then the amount of fuel supplied must be reduced to maintain the given air ratio.

The method according to the invention is explained in detail below with the aid of the accompanying drawings.

BRIEF DESCRIPTION OF THE DRAWINGS

FIG. 4 is a flow chart showing another embodiment of the method according to the invention.

DETAILED DESCRIPTION OF THE PREFERRED EMBODIMENTS

Figure 1:
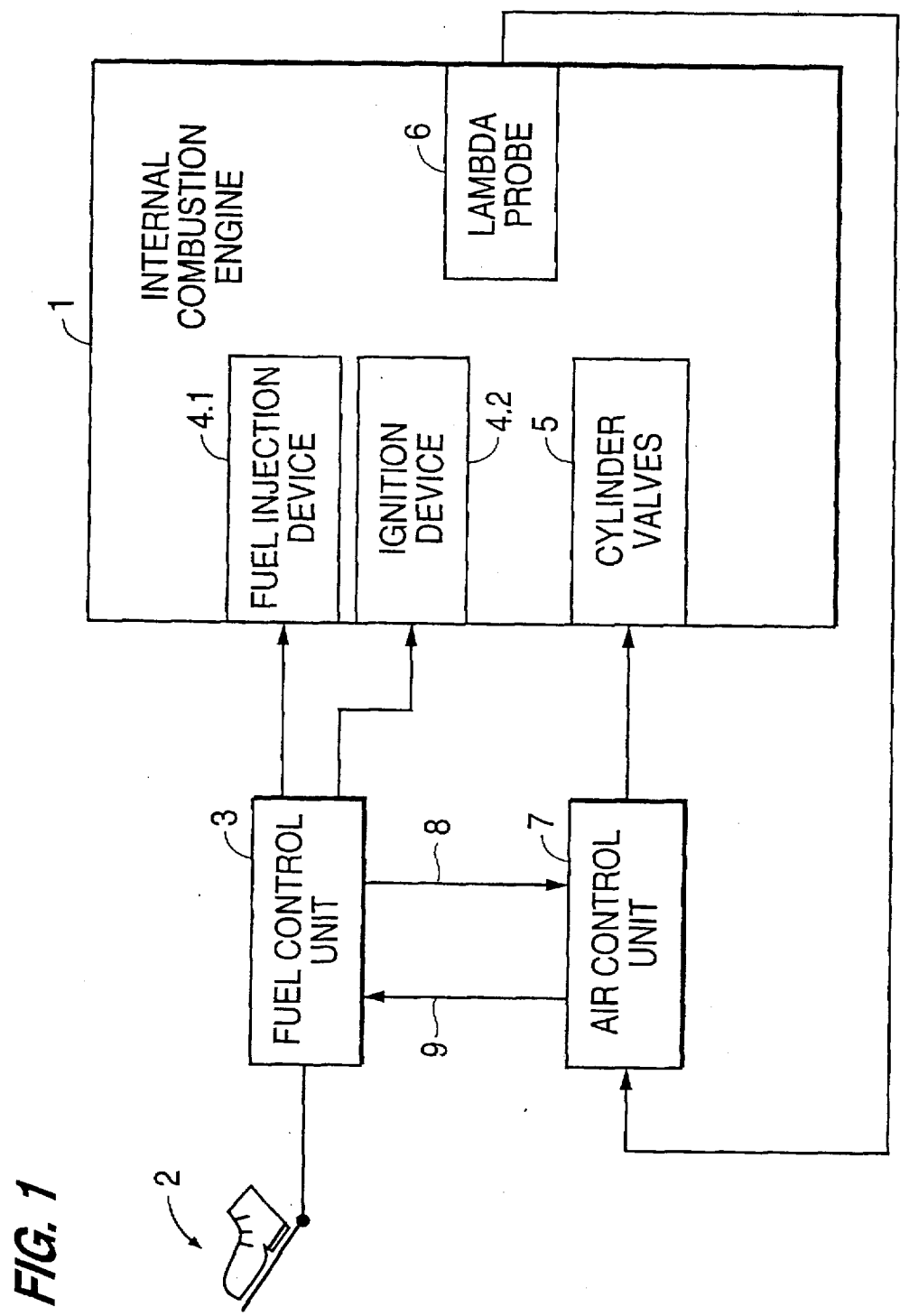
FIG. 1 is a functional block diagram illustrating the basic principles of the method according to invention.

In accordance with FIG. 1, a predetermined load for a piston-type internal combustion engine 1 is entered via a gas pedal 2 that triggers a fuel control unit 3, which is equipped with respective performance characteristics for pedal performance, ignition and fuel injection and through which a corresponding amount of fuel is injected into the cylinders of the engine through a fuel injection device 4.1, and an ignition device 4.2 is triggered.

A necessary fresh air amount is controlled by a triggering of the gas changeover valves 5, referred to hereinafter as cylinder valves 5, which, for example, are designed as fully variable controllable cylinder valves. For example, it is possible to effect a fully variable triggering of the cylinder valves by coordinating a separate electromagnetic actuator to each cylinder valve, so that in each case the opening and closing times and thus also the opening and closing interval are brought about by a corresponding control of the electromagnetic actuators which are known, for example, from German Patent No. 3,024,109.

The Lambda air ratio is then measured with a Lambda probe 6. The obtained measured value is sent to an air control unit 7, which includes corresponding valve performance characteristics and through which the cylinder valves are triggered so that, for the predetermined fuel amount, the required amount of air needed in each case for maintaining the air ratio is supplied to the respective cylinder through a control based on the respective valve performance characteristics such as the opening times for the gas intake valves. The fuel dosing therefore takes place according to the predetermined load entered by the gas pedal 2, while the amount of air is supplied subsequently, depending on the air ratio recorded by the Lambda probe 6 and preset by air control unit 7.

As shown in FIG. 1, it is possible to predetermine a coarse control/regulation of the air ratio through a linkage 8 of fuel control unit 3 and air control unit 7, wherein it is useful to preset the "intake closing" parameter, so that a coarse value is provided for the air ratio, which depends on the predetermined fuel amount. A precise control/regulation of the air ratio then takes place by air control unit 7 and a triggering of one or more control reaction times that influence the amount of air in the cylinder, for example the "intake opening" and/or "exhaust opening" and/or "exhaust closing parameters."

Because the above-described regulation of the air ratio is possible only up to a limit range for certain operational points, that is only to the range where the cylinder has reached its maximum fresh air supply, the method of the invention also provides for the option of reducing the injected fuel amount via a respective air control unit connection 9, regardless of the load predetermined by the gas pedal, if it is determined through Lambda probe 6 that the operation is too rich during this operational state.

Figure 2:
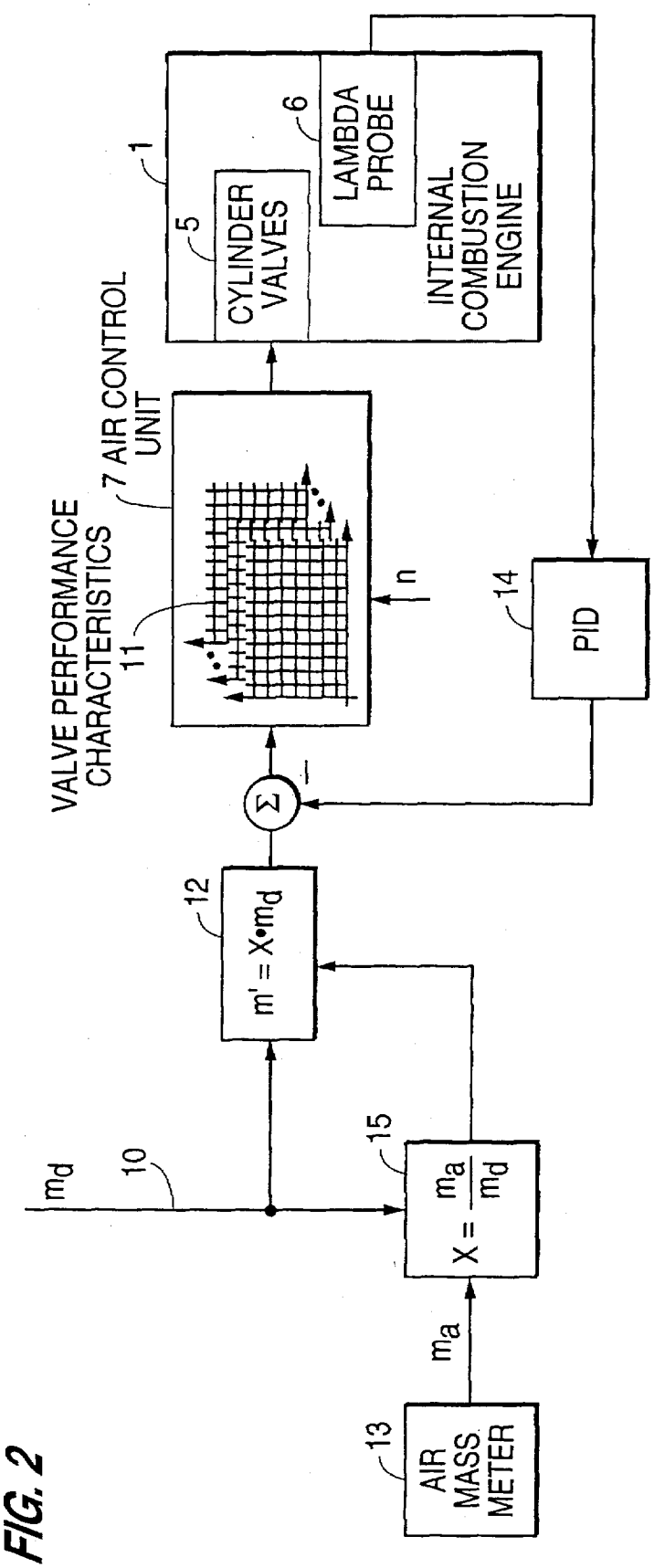
FIG. 2 is a functional block diagram illustrating one embodiment of the method according to the invention.

FIG. 2 shows an embodiment of the method of the invention. Prior to entering a desired value $m_d$ at 10 for the air mass into air control unit 7, where value performance characteristics 11 are stored, for example, the desired value $m_d$ for the air mass (amount of air) is multiplied by a factor x inside a series-connected unit 12, in order to produce a new desired value m'. The factor x is designed to balance tolerances or characteristics or deviations in the pilot control that the developed through slow changes.

A "false" predetermined value, for example, is obtained if the air pressure does not correspond to normal conditions. The correction factor x is determined from the quotient of the actual air mass $m_a$, measured for example with an air mass meter 13, and the predetermined value $m_d$. In order to prevent the effects of short-term deviations, e.g caused by dynamic processes, either value x or one of the input parameters are smoothed. This smoothing can take place, for example, through forming of an average value, low-pass filtering or blanking out of a recognized unsteady condition.

A precise regulation of the air ratio, on the other hand, can be made with the Lambda probe 6, for example via a proportional integral differential (PID) control 14.

It is even possible to do without the air mass meter 13 if factor x is determined with the help of the output error of the PID control. If, for example, the integrated signal value of the I-share (Integral-share) of the control is used, a low-pass filter value for value x is then obtained immediately.

Figure 3:
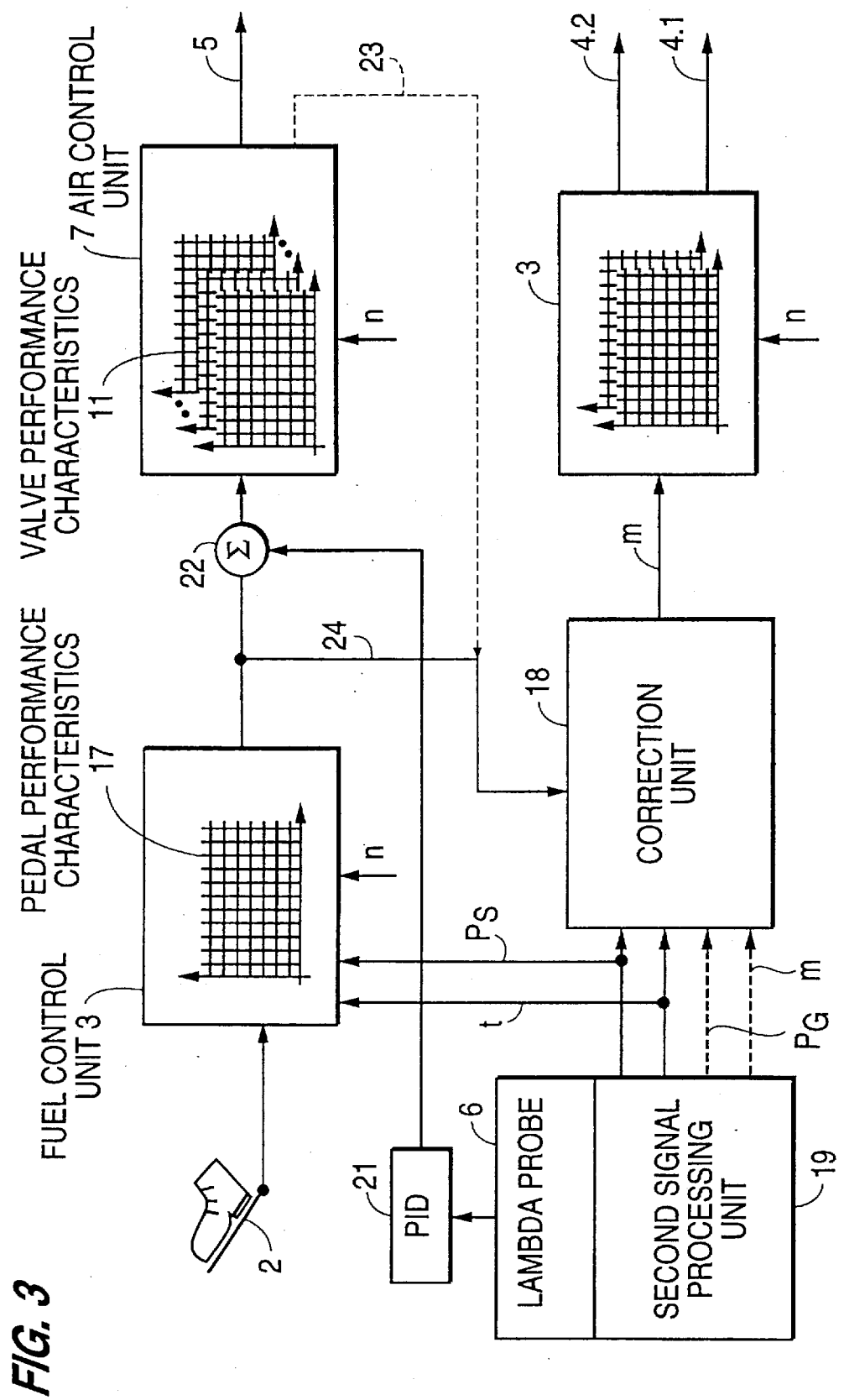
FIG. 3 is a functional block diagram illustrating another embodiment of the method according to the invention.

Another embodiment of the method according to the invention is shown in FIG. 3, The driver's request, transmitted via gas pedal 2, initially travels to drive unit 27 with pedal performance characteristic being separately installed but in connection with control unit 3, where a desired charge is determined with the aid of speed data and, if necessary, also depending on other values such as air temperature and/or intake pipe pressure. The desired charge information serves to trigger air control unit 7, which controls cylinder valves 5, for example with the aid of crank angle and time information stored in the valve performance characteristics. On the other hand, the desired charge information is sent to a correction unit 18, by way of a connection 24, which computer an air mass information from the desired charge information. To do this, the desired charge, which practically represents the air volume information, is converted mathematically to air mass m with the aid of information from a sensor signal processing unit 19 and via temperature t and pressure $P_s$ of the sucked-in air. Alternatively, as already shown in FIG. 2, a correction factor can be determined from a measured air mass value. In this case as well, the possibility exists in principle of obtaining this correction information instead from the Lambda control circuit.

Another option is to additionally take into account the effects of a varying exhaust gas back pressure $P_G$. The air mass m, calculated in this way, is used as load information for the control of the injection and ignition.

The control circuit for the precise adjustment of the air ratio here again intervenes in the air dosing path. The information from Lambda probe 6 is superimposed on the desired charge information for the valves via a controller 21 with, for example, PID behavior.

The "desired charge" information can be the air amount under standard conditions. In the developmental phase, however, another value, which is easily measured at the test stand, may offer itself for application reasons. Alternatively, the indicated mean effective pressure (pmi) or the torque transmitted by the engine can also be used. The latter has the advantage that a "torque interface" is available at this point in the control unit, meaning that at this point, the torque requirement for the engine can be changed through adding or subtracting. This is of interest, for example, for the speed control systems or anti-slip-control systems.

As an alternative to obtaining the desired charge information directly from the drive pedal performance characteristic 17, the information can also be obtained from the valve performance characteristics 11 of air control unit 7. This can be particularly helpful for engine tuning (calibration). In that case, an optional value that represents the load can serve as an input parameter for the valve performance characteristic. During the application process, the resulting charge value or an air mass value, e.g. determined under standard conditions, is entered into the performance characteristic as additional information. This information is then made available to correction unit 18 via connection 23. As a result, connection 24 is not necessary. However, the Lambda control must be modified somewhat in that case. An intervention via point 22 would influence the air mass as well as the fuel mass and thus leave the Lambda unchanged. For that reason, the adjustment must be made after the valve control data have been determined and must have a direct effect, or the access to the valve performance characteristics will vary, for some data prior to correction through the Lambda control and for others following the correction. In particular, the performance characteristic for the air mass information must then be addressed through the uncorrected value. The main actuating variable, that is the "intake closing" parameter, can be used as another uncorrected intervention. Alternatively, however, a conventional Lambda control via the supplied fuel amount is conceivable for this method as well.

FIG. 4 shows a flow chart of another embodiment of the method of the invention for maintaining a predetermined air ratio, in which after the beginning (step 1) of the loop, a course adjustment of the air ratio is effected by dosing a required amount of air by controlling the "intake closing" parameter (step 2). The air ratio is measured (step 3) and it is determined whether the air ratio is OK (step 4). In response to this determination, a precise adjustment of the air ratio can be made by changing one of the "in take opening," "exhaust opening" and "exhaust closing" parameters at step 5. Of course, the regulation of air ratio via the cylinder valve drives is possible only within certain adjustment range limits, that is, until the cylinder has filled with the maximum amount of fresh air. If it is determined that the operating state during this operation is too rich, the amount of fuel supplied must be reduced to maintain the desired air ratio.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for controlling a piston-type internal combustion engine having cylinders and cylinder valves comprising gas intake valves and gas exhaust valves utilized in a manner for controlling fuel and air amounts input to the cylinders, comprising:

dosing a fuel amount to the cylinder by fuel injection devices depending on a desired engine output; and dosing a required air amount depending on the amount of fuel injected and a measured exhaust gas composition by controlling opening times of at least the gas intake valves.

2. The method according to claim 1, wherein the step of dosing a required amount of air includes measuring an air ratio with a Lambda probe and controlling the opening times for the cylinder valves as a function of the air ratio that is measured with the Lambda probe.

3. The method according to claim 1, wherein the opening times of the gas intake valves are controllable according to an "intake opening" parameter and an "intake closing" parameter, and the step of dosing a required amount of air includes controlling the opening times for the gas intake valves by changing the "intake closing" parameter during a time predetermined by engine operation for the "intake opening" parameter.

4. The method according to claim 1, wherein the opening times of the gas intake valves are controllable by an "intake opening" parameter and an "intake closing" parameter, and the gas exhaust valves are controllable according to an "exhaust opening" parameter and an "exhaust closing" parameter, and the step of dosing a required amount of air includes predetermining a course adjustment for an air ratio by controlling the "intake closing" parameter and effecting a precise adjustment of the air ratio by changing at least one of the "intake opening," "exhaust opening" and "exhaust closing" parameters.

5. The method according to claim 1, further including reducing the fuel amount to maintain a given air ratio in a cylinder upon exceeding of control range limits predetermined by a maximum filling with fresh air of the cylinder.

* * * * *